United States Patent
Yasugi (10) Patent No.: US 8,174,143 B2
(45) Date of Patent: May 8, 2012

(54) CONTROL DEVICE OF WIND TURBINE GENERATOR AND CONTROL METHOD THEREOF

(75) Inventor: Akira Yasugi, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 12/908,291

(22) Filed: Oct. 20, 2010

(65) Prior Publication Data

US 2011/0309804 A1    Dec. 22, 2011

Related U.S. Application Data

(63) Continuation of application No. PCT/JP2010/060231, filed on Jun. 16, 2010.

(51) Int. Cl.
    *F03D 9/00* (2006.01)
(52) U.S. Cl. .................................. 290/55; 290/52
(58) Field of Classification Search ............ 322/32, 322/34, 37, 19, 24; 290/55, 52
    See application file for complete search history.

(56) References Cited

U.S. PATENT DOCUMENTS

| | | | | |
|---|---|---|---|---|
| 5,900,722 | A * | 5/1999 | Scott et al. | 322/46 |
| 6,118,186 | A * | 9/2000 | Scott et al. | 290/40 B |
| 6,420,796 | B1 * | 7/2002 | Lagerwey | 290/44 |
| 7,078,825 | B2 * | 7/2006 | Ebrahim et al. | 290/52 |
| 7,545,123 | B2 * | 6/2009 | Sumimoto | 322/25 |
| 2009/0167021 | A1 | 7/2009 | Andersen | |
| 2009/0234510 | A1 | 9/2009 | Helle et al. | |

FOREIGN PATENT DOCUMENTS

| | | |
|---|---|---|
| JP | 2001-234845 A | 8/2001 |
| JP | 2003-21047 A | 1/2003 |
| JP | 2003-83229 A | 3/2003 |
| JP | 2003-134892 A | 5/2003 |
| JP | 2003-317763 A | 11/2003 |
| JP | 2006-296200 A | 10/2006 |
| JP | 2007-060742 A | 3/2007 |
| JP | 2009-11154 A | 1/2009 |
| JP | 2009-79559 A | 4/2009 |
| JP | 2009-303355 A | 12/2009 |
| WO | 2005/108784 A1 | 11/2005 |

OTHER PUBLICATIONS

International Search Report of Application No. PCT/JP2010/060231 mailed Sep. 21, 2010.
Australian Office Action for 2010281738, mailed Jul. 11, 2011.

* cited by examiner

*Primary Examiner* — Tulsidas C Patel
*Assistant Examiner* — Iraj A Mohandesi
(74) *Attorney, Agent, or Firm* — Kanesaka Berner & Partners, LLP (57) ABSTRACT

A control device of a wind turbine generator capable of controlling an active power based on an instruction value, includes a measurement means configured to measure a frequency of a utility grid. The instruction value for controlling the active power is generated to a direction suppressing a variation of the frequency of the utility grid based on conversion information which indicates a predetermined relation between the variation of the frequency and the instruction value when the variation of the frequency of the utility grid measured by the measurement means exceeds a predetermined standard. A wind turbine generator which controls suppression of a disturbance of a grid in its initial stage is realized.

7 Claims, 6 Drawing Sheets

CONTROL DEVICE OF WIND TURBINE GENERATOR AND CONTROL METHOD THEREOF

RELATED APPLICATIONS

The present application is a Continuation of International Application Number PCT/JP2010/060231, filed Jun. 16, 2010, the disclosure of which is hereby incorporated by reference herein in its entirety.

TECHNICAL FIELD

The present invention relates to a control of active power generated by a wind turbine generator.

BACKGROUND ART

In a utility grid, it is ideal that a balance between supply and demand is maintained, but the balance is sometimes deviated. The shifting of balance appears as a frequency variation. When a lack of power supply ability is caused because of a generator isolation and a grid failure, the grid disturbance (the frequency variation, and the like) occurs, and accordingly, without the control ability, the disturbance leads to corruption of the entire grid, thereby causing a risk of a massive power failure. Immediately after the corruption of the balance, a period of the frequency variation is short, and accordingly hydroelectric power stations which have high responsibility especially to an output demand value, for example, can contribute the control thereof. After the variation has been in a quasi-equilibrium state at a slightly-higher frequency after the variation calmed down, the means to stop the wind turbine has been taken for an object of suppressing the output.

As a reference example related to a control of a wind turbine generator in the frequency variation of utility grid, Patent Literature 1 is cited. In Patent Literature 1, a technique intended to suppress the variation that is given to the frequency of grid by a wind turbine generation is described. To achieve this object, a PID control and a control having a hysteresis each based on a deviation between a measured frequency of grid and a normal frequency are carried out.

CONVENTIONAL TECHNIQUE LITERATURES

Patent Literature

Patent Literature 1: US Patent Application No. 2009/0167021

SUMMARY OF INVENTION

In recent years, the scale of the power generation of a wind turbine generator has been increased. Accordingly, also in the wind turbine generator, when a grid disturbance has occurred, it is considered that a control to suppress the disturbance from the initial period will be effective.

An object of the present invention is to realize a control of a wind turbine generator capable of responding to a frequency variation of a utility grid immediately after an occurrence of the grid disturbance.

According to an aspect of the present invention, a control device of a wind turbine generator capable of controlling an active power based on an instruction value, includes: a measurement means for measuring a frequency of a utility grid; and an instruction value generation means for generating the instruction value for controlling the active power to a direction suppressing a variation of the frequency of the utility grid based on conversion information which indicates a predetermined relation between the variation of the frequency and the instruction value when the variation of the frequency of the utility grid measured by the measurement means exceeds a predetermined standard.

According to another aspect of the present invention, the measurement means measures the frequency of the utility grid based on a moving average of data obtained by a predetermined sampling frequency.

According to further another aspect of the present invention, the measurement means is configured to: measure the frequency of the utility grid by a first sampling frequency in an initial phase after a start of the variation of the utility grid; and measure the frequency of the utility grid by a second sampling frequency longer than the first frequency in a later phase after the initial phase of the variation of the utility grid.

According to further another aspect of the present invention, the instruction value generation means is configured to: generate the instruction value based on a first gain at a control system generating the instruction value in an initial phase after a start of the variation of the frequency of the utility grid; and generate the instruction value based on a second gain smaller than the first gain at the control system in a later phase after the initial phase of the variation of the frequency of the utility grid.

According to further another aspect of the present invention, the measurement means or the instruction value generation means is configured to: determine that the variation of the frequency of the utility grid transfers to the later phase when a predetermined time passes after the start of the variation or the variation of the frequency becomes equal to or less than a predetermined threshold value.

According to further another aspect of the present invention, the control device is configured to control a plurality of wind turbine generators.

According to an aspect of the present invention, a control method of a wind turbine generator capable of controlling an active power based on an instruction value, includes: measuring a frequency of a utility grid; and generating the instruction value for controlling the active power to a direction suppressing a variation of the frequency of the utility grid based on trans form information which indicates a predetermined relation between the variation of the frequency and the instruction value when the variation of the frequency of the utility grid measured by the measurement means exceeds a predetermined standard.

According to the present invention, a control of the wind turbine generator capable of making an initial response to a grid disturbance can be realized.

BRIEF DESCRIPTION OF DRAWINGS

The above-mentioned objects, other objects, effects, and features are clarified from descriptions of embodiments in association with attached drawings, in which.

DESCRIPTION OF EMBODIMENTS

Figure 1:
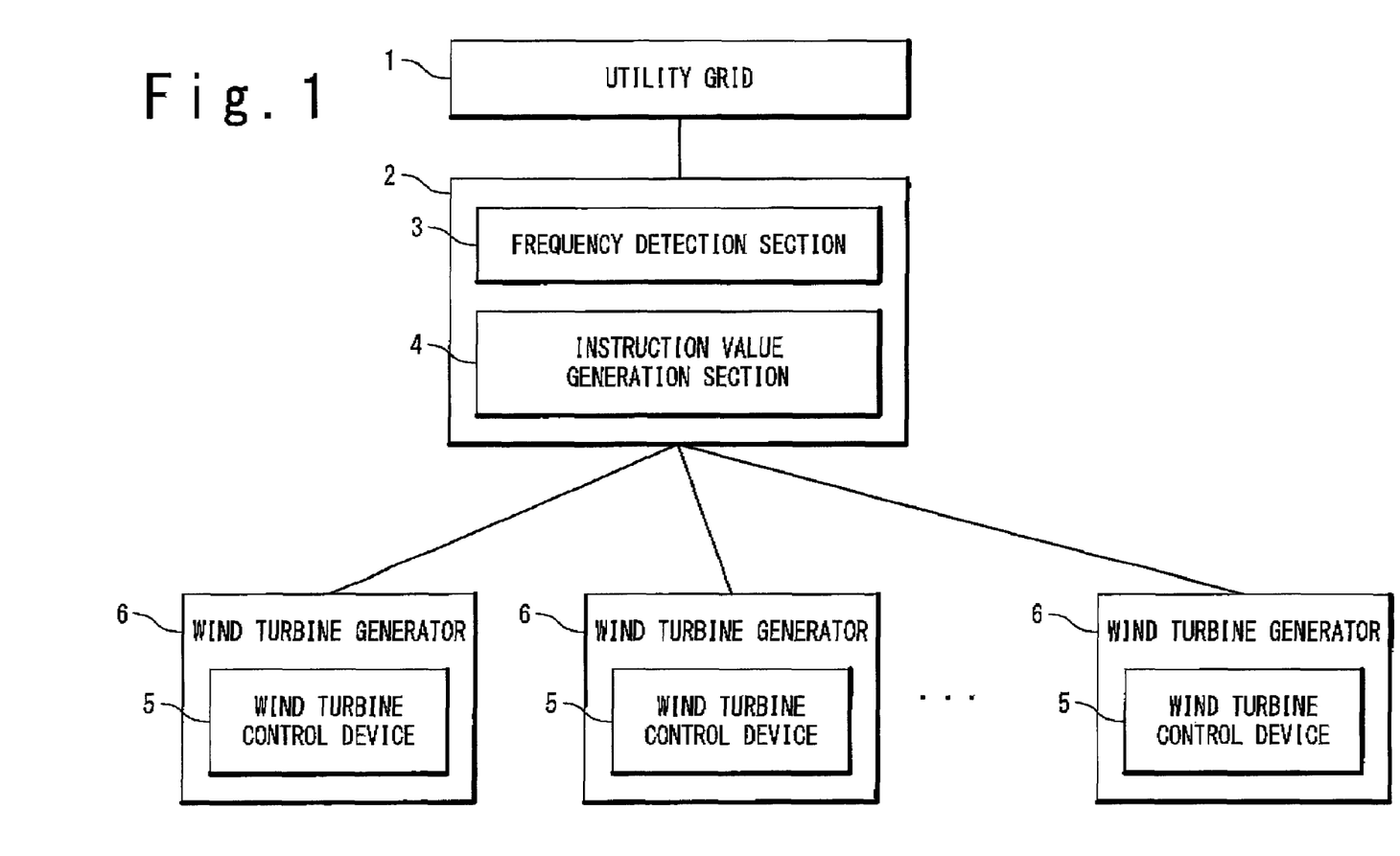
FIG. 1 shows a configuration of a wind farm.

Referring to drawings, some embodiments of the present invention will be explained below. FIG. 1 shows a configuration of a wind farm according to the present embodiment. The wind farm includes a control device 2. The control device 2 includes a frequency detection section 3 and an instruction value generation section 4. The frequency detection section 3 and the instruction value generation section 4 are functional blocks that are realized by a CPU reading and executing programs stored in a storage device. The control device 2 is connected to each wind turbine control device 5 of a plurality of wind turbine generators 6 belonging to the wind farm. Each of the wind turbine generators 6 includes a power generator and a power conversion section. A torque generated due to wind power by the wind turbine generator 6 is converted into an electric power by the power generator, and is converted into an electric power of the same type as that of the utility grid by the power conversion section. In the control device 2, the plurality of wind turbine generators 6 and a utility grid 1 is interconnected in a grid.

Figure 2:
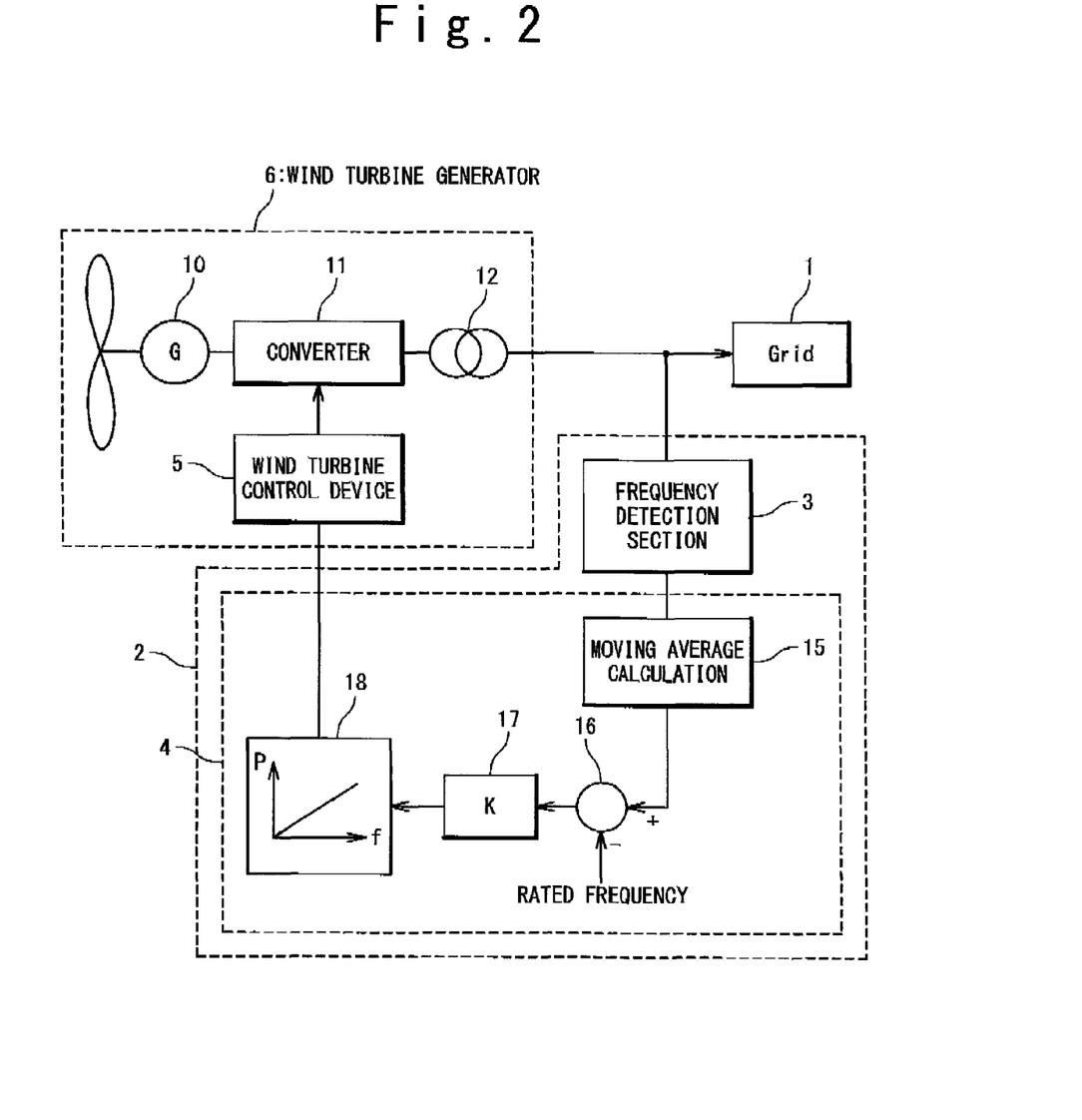
FIG. 2 shows configurations of a wind turbine generator and a control device.
Figure 3:
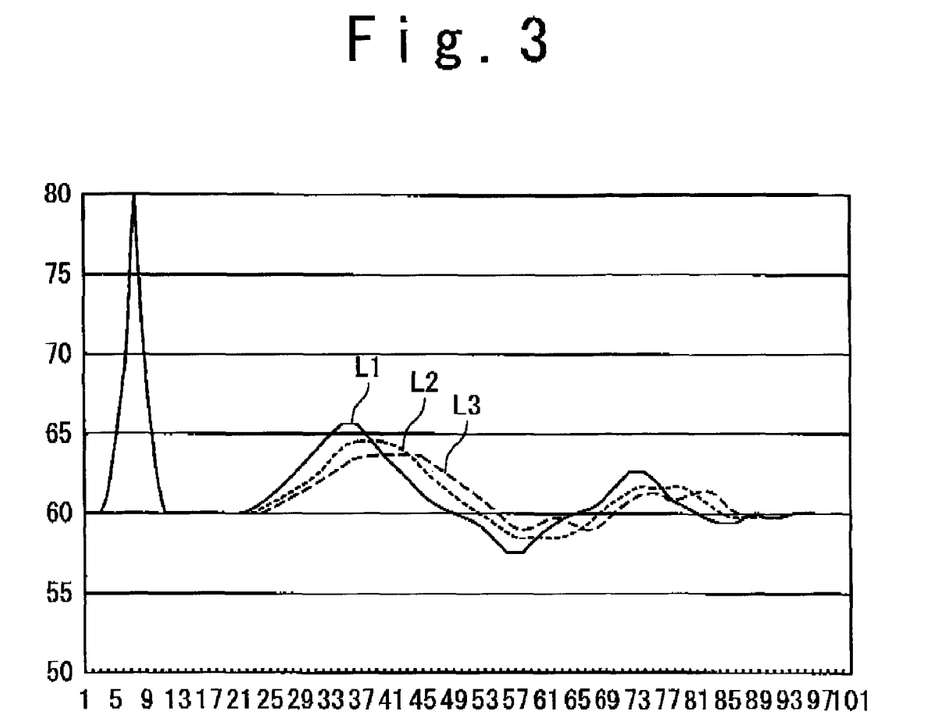
FIG. 3 shows an example of a moving average.

FIG. 2 shows configurations of the wind turbine generator 6 and the control device 2. The frequency detection section 3 serves as measurement means adapted to measure a frequency of the utility grid 1, and carries out the sampling in a period of constant time Δt on the basis of information indicating a detection value of a voltage or a frequency of the utility grid 1 obtained by the grid voltage or grid frequency detection section 3. A moving average value calculation section 15 calculates a moving average value of a sampled grid frequency in real time. This moving average value can be obtained by calculating an average value of numeral values of frequencies at the respective sampled timing, but may be obtained by applying a low-pass filter to the frequencies. FIG. 3 is an example of the moving average values. A moving average value L2 obtained by carrying out the sampling to the detected frequency L1 in the period of Δt is drawn. A moving average value L3 shows an example of a case where a longer sampling period is employed, in which the following characteristic is relaxed.

The instruction value generation section 4 generates an instruction value on the basis of a product of: a difference between a moving average value of a frequency and a rated frequency of a utility grid; and a parameter conversion coefficient for converting a difference of a frequency into a difference of an electric power. Specifically, the instruction value is generated in the following manner. A subtractor 16 calculates a difference Δf between a preliminarily-stored rated frequency of the utility grid 1 and a moving average value obtained by the moving average value calculation section 15. A gain multiplier 17 multiplies the difference by a preliminarily-set gain K. A parameter converter 18 multiplies KΔf by a predetermined parameter conversion coefficient to convert the KΔf into ΔP that is a difference between a measured value of an active power and a target value. A converter 11 controlled by the wind turbine control device 5 carries out a control such as a proportional control on the basis of the difference ΔP, and converts electric power generated by a power generator 10 of the wind turbine generators 6. The converted electric power is converted by an electric transformer 12 to be interconnected to the utility grid 1.

Figure 4:
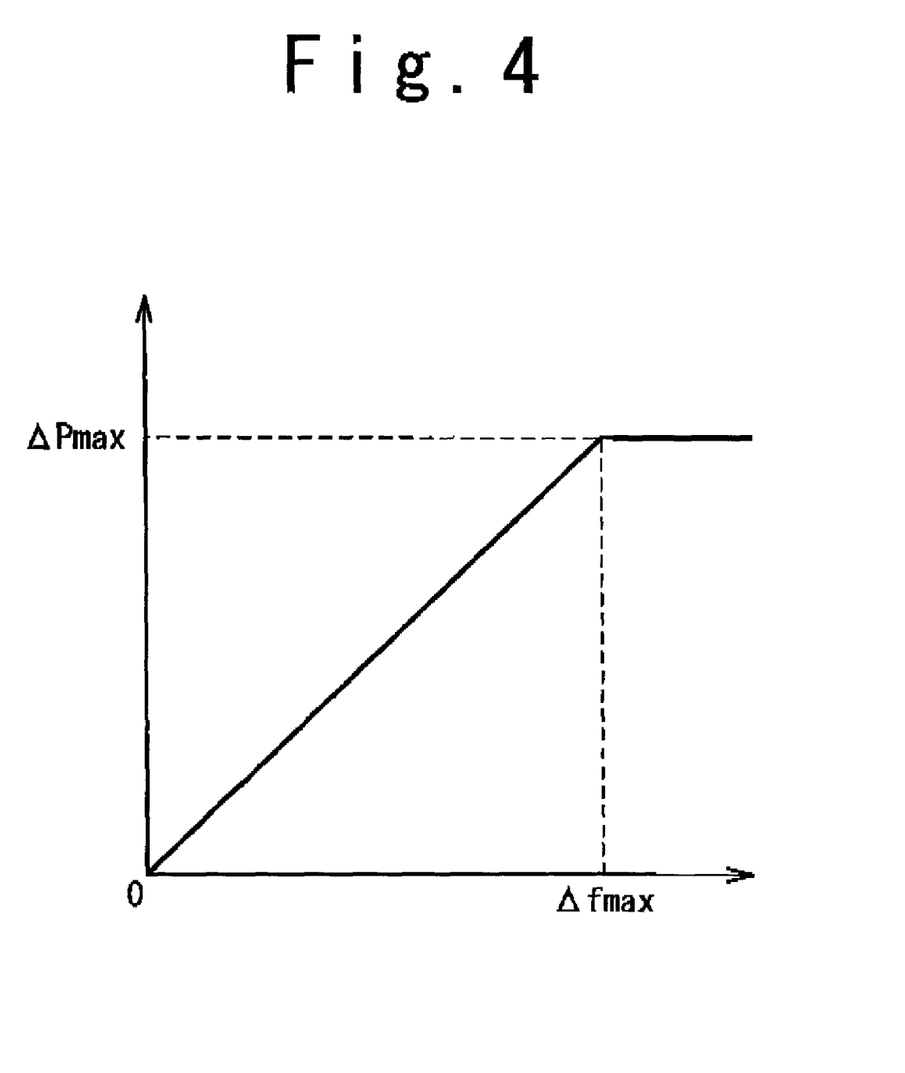
FIG. 4 shows a parameter conversion coefficient.

FIG. 4 shows a parameter conversion coefficient in a parameter converter 18. This parameter conversion coefficient is a piece of conversion information representing a preliminarily-set relationship between a frequency variation amount and an active power instruction value. Δfmax shows a difference between the maximum value of the frequency moving average value that is a target of the following and the preliminarily-set rated frequency. ΔPmax is a preliminarily-set value showing the maximum value of an output control value in which the grid does not become unstable. The straight line connecting the intersection point to the origin point where a difference between the frequency and the power generation amount is zero is the operation points by the control device 2. However, the ΔP has a limit on operational restriction. As the limit on operational restriction, the active power corresponding to the instruction value of ΔP exceeding an operation ability of the wind turbine generator cannot be outputted, for example. (1)

This control may be carried out in the wind turbine control device 5 of each wind turbine generator 6. However, in a view of stability of control of the entire wind farm, it is more preferable to adjust the electric power amount in the entire wind firm than the independent adjustment of electric power amounts in the respective wind turbine generators 6. Further, also in a view that a person in charge of the wind farm can easily recognize present states, it is desirable to adjust the power amount in the entire wind farm. Accordingly, it is desirable that the calculation shown in FIG. 2 made by the moving average value calculation section 15, the subtractor 16, the gain multiplier 17, and the parameter converter 18 is carried out by the control device 2 of the entire wind farm to which the plurality of wind turbine generator 6 belong.

Moreover, in view of a rapid responsibility to the grid disturbance, it is desirable that the calculation carried out by the control device 2 is simple. For this object, it is desirable that the instruction value generation section 4, for example, equally divides the deviation value ΔP of the electric power by the number (n) of the wind turbine generators 6 (a preliminarily-stored value) operating in the wind farm and sends the instruction value ΔP/n to the respective wind turbine control devices 5.

Next, the sampling period will be explained. As understood from FIG. 3, the following characteristics of varying frequency depend on the sampling frequency Δt. The frequency variation generated when a balance of electric power flow is lost has the following tendency. In an initial period of variation, a period where the variation amplitude is large continues for approximately several dozen seconds. In a latter period of the variation, a period where the variation amplitude is small continues for approximately a few minutes. After that, the variation amplitude converges within an allowable variation.

Accordingly, in the initial stage of a start of variation, it is required to boost up following characteristics and suppress the variation amplitude and to prevent diverging of the frequency. For this reason, in the initial period of variation, a first sampling period set to be a small value is used. On the other hand, in the latter period of the variation, the variation amplitude is small, and accordingly a high following characteristic to the varying frequency is not required. Rather, it is required to gently reduce the deviation to the rated frequency. Accordingly, in the latter period of the variation that is a subsequent time zone to the initial period of the variation, a second sampling period set to be a larger value than the first sampling period is used.

Instead of this change of the sampling period or at the same time with the change of the sampling period, the gain may be changed in the initial period and in the latter period of the variation. In this case, the instruction value generation section 4 generates an instruction value by multiplying a first gain in a first time zone of the initial period of the variation, and then generates an instruction value by multiplying a smaller second gain than the first gain in a second time zone of the latter period of the variation. In this control, the same effects can also be obtained.

Figure 5:
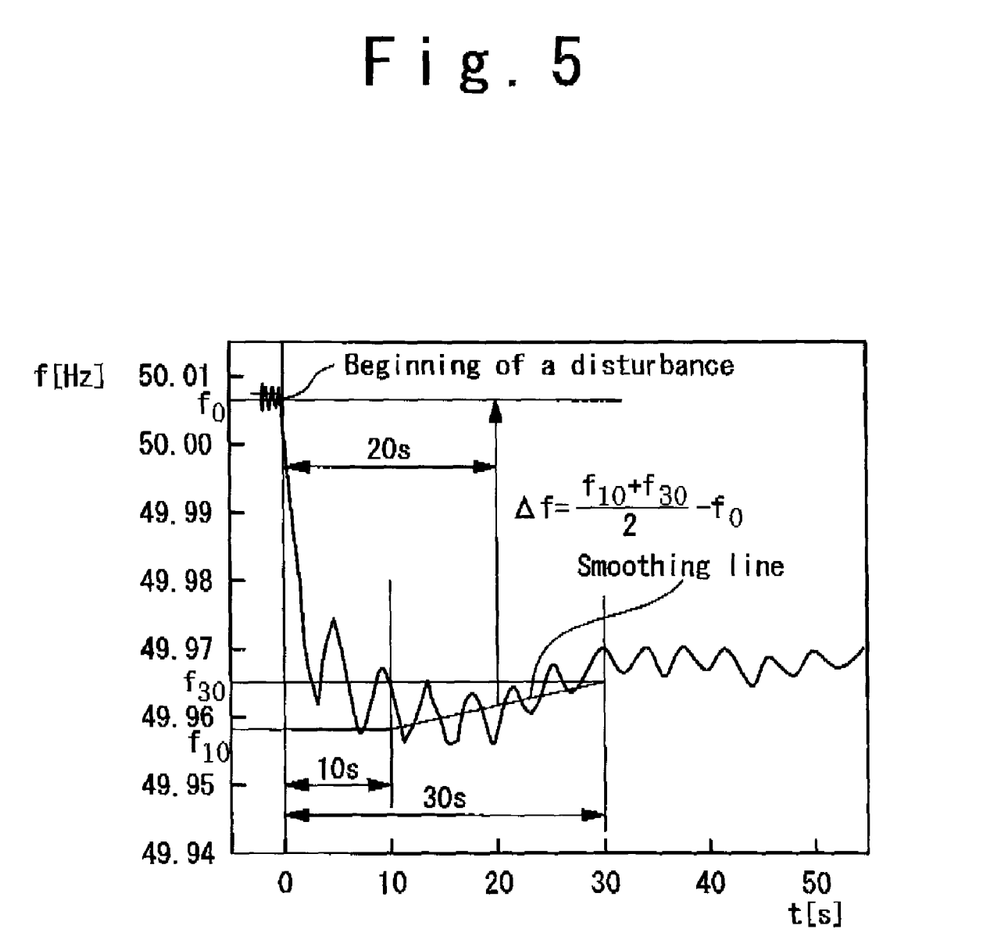
FIG. 5 shows an example of a variation of frequency and of frequency deviation Δf.

FIG. 5 shows an example of the variation of frequency; and the frequency deviation Δf. The frequency rapidly drops in the initial period of the variation (t=0), and the initial period of the variation in a large amplitude starts. The "smoothing line" in the drawing shows the line obtained by approximating the frequency waveform in the period of 20 seconds from t=10 to 30 due to the least-square method in a linear function, in the latter period of variation where the amplitude of the variation starts to be gradually small. $\Delta f$ is determined on the basis of a value obtained by averaging the frequency waveform in this approximation. When the values at t≅10 and 30 on this line are respectively $f_{10}$ and $f_{30}$ and the rated frequency is $f_0$, it is satisfied that $\Delta f=(f_{10}+f_{30})/2-f_0$. The control device 2 determines the respective timings of: the initial period of the variation, the latter period, and the converging of variation, and changes the sampling period $\Delta t$ on the basis of the determination.

Figure 6:
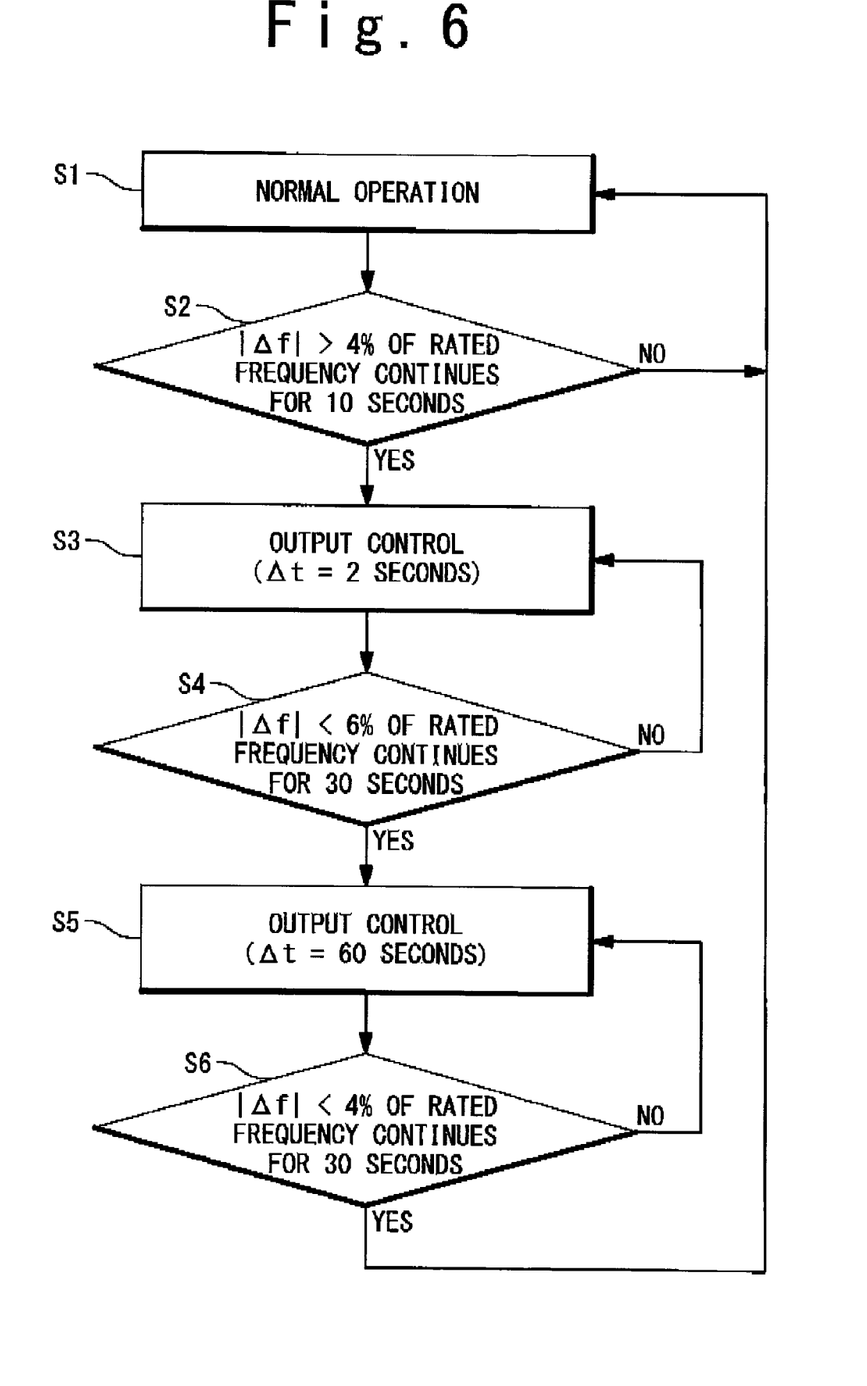
FIG. 6 shows an operation of the control device.

FIG. 6 is a flowchart showing a process carried out by the control device 2 regarding the change of the sampling frequency. Normally, the sampling frequency of a first value set to be small (for example, approximately 2 to 3 seconds) is set as a default value so as to follow the frequency variation in the case where the grid disturbance occurs (S1). When the variation of frequency exceeds a predetermined standard, the instruction value generation section 4 compensates the variation on the basis of the moving average value of the detected frequencies, and determines an instruction value of the electric power outputted by the power generator 10 of the wind turbine generator 6 so as to control the active power in order to suppress the variation of the frequency of the utility grid. As the predetermined standard, for example, when a time period where $\Delta f$ shifts in a predetermined width (for example, ±4%) or more with respect to the rated frequency continues for a predetermined period (for example, 10 seconds) or more, it is determined that the grid disturbance has occurred (S2 YES). In other cases, the process returns to a normal operation (S2 NO).

When it is determined that a grid disturbance has occurred, the frequency of the utility grid is sampled at the default sampling period (2 seconds in FIG. 6), and an output control of the wind power device 6 is carried out on the basis of a moving average of the frequency (S3). While an amplitude of the moving average obtained as the result thereof is large, a waiting process is carried out (S4 NO). When a state where the amplitude of the moving average is within a first width (for example, ±6%) has continued for a predetermined period (for example, 30 seconds) or more (S4 YES), the sampling period $\Delta t$ is automatically changed to a longer second value (for example, one minute) so as to follow the state where the frequency of the grid frequency variation is low (S5). This control is continued until a state where $\Delta f$ is within a second width (for example, ±4%) smaller than the first width continues for a predetermined period (for example, 30 seconds) or more (S6 NO). In a case where the variation amplitude of $\Delta f$ is lowered under this standard, the process returns to the normal operation (56 YES).

In the example of FIG. 6, in the case where the variation amount of frequency of the utility grid becomes under a predetermined standard in the control at the initial period stage of the occurrence of the grid disturbance, the process proceeds to the control of the latter period stage of the disturbance. Depending on characteristics of the disturbance of the utility grid, in the case where a predetermined time starting from the timing when the instruction value generation section 4 has determined that the grid disturbance occurred has passed, the process may proceed to the control at the latter period stage of the variation instead of this control.

In this manner, when the wind farm constantly monitors the frequency variation of the grid and instantly controls the active power, with respect to the grid frequency variation, so as to suppress the variation, the process can rapidly contribute to the diverging of the grid frequency variation. In particular, in accordance with further increase of the future wind turbine generation power, it is considered that this control will be effective to suppress the grid disturbance.

The present invention has been described above referring to some embodiments; however, the present invention is not limited to the above-mentioned embodiments. Various modifications can be applied to the above-mentioned embodiments. For example, the above-mentioned embodiments can be mutually combined to each other.

EXPLANATION OF THE REFERENCE NUMERALS

1; UTILITY GRID
2: CONTROL DEVICE
3: FREQUENCY DETECTION SECTION
4: INSTRUCTION VALUE GENERATION SECTION
5: WIND TURBINE CONTROL DEVICE
6: WIND TURBINE GENERATOR
10: POWER GENERATOR
11: CONVERTOR
12: ELECTRIC TRANSFORMER
15: MOVING AVERAGE VALUE CALCULATION SECTION
16: SUBTRACTOR
17: GAIN MULTIPLIER
18: PARAMETER CONVERTER
L1: DETECTED FREQUENCY
2: MOVING AVERAGE VALUE
L3: MOVING AVERAGE VALUE

What is claimed is:

1. A control device of a wind turbine generator capable of controlling an active power based on an instruction value, comprising:
   a measurement unit configured to measure a frequency of a utility grid; and
   an instruction value generation unit configured to generate the instruction value for controlling the active power to a direction suppressing a variation of the frequency of the utility grid based on conversion information which indicates a predetermined relation between the variation of the frequency and the instruction value when the variation of the frequency of the utility grid measured by the measurement unit exceeds a predetermined standard,
   wherein the measurement unit is configured to:
      measure the frequency of the utility grid by a first sampling period in an initial phase after a start of the variation of the utility grid; and
      measure the frequency of the utility grid by a second sampling period longer than the first period in a later phase after the initial phase of the variation of the utility grid.

2. The control device of the wind turbine generator according to claim 1, wherein the measurement unit is configured to measure the frequency of the utility grid based on a moving average of data obtained by a predetermined sampling frequency.

3. The control device of the wind turbine generator according to claim 1, wherein the instruction value generation unit is configured to:
   generate the instruction value based on a first gain at a control system generating the instruction value in an initial phase after a start of the variation of the frequency of the utility grid; and generate the instruction value based on a second gain smaller than the first gain at the control system in a later phase after the initial phase of the variation of the frequency of the utility grid.

4. The control device of the wind turbine generator according to claim 1, wherein the measurement unit or the instruction value generation unit is configured to:
determine that the variation of the frequency of the utility grid transfers to the later phase when a predetermined time passes after the start of the variation or the variation of the frequency becomes equal to or less than a predetermined threshold value.

5. The control device of the wind turbine generator according to claim 1, wherein the control device is configured to control a plurality of wind turbine generators.

6. A control method of a wind turbine generator capable of controlling an active power based on an instruction value, comprising:
measuring a frequency of a utility grid; and
generating the instruction value for controlling the active power to a direction suppressing a variation of the frequency of the utility grid based on transform information which indicates a predetermined relation between the variation of the frequency and the instruction value when the variation of the frequency of the utility grid measured by the measurement unit exceeds a predetermined standard,
wherein said measuring comprises
measuring the frequency of the utility grid by a first sampling period in an initial phase after a start of the variation of the utility grid; and
measuring the frequency of the utility grid by a second sampling period longer than the first period in a later phase after the initial phase of the variation of the utility grid.

7. A control device of a wind turbine generator capable of controlling an active power based on an instruction value, comprising:
a measurement unit configured to measure a frequency of a utility grid; and
an instruction value generation unit configured to generate the instruction value for controlling the active power to a direction suppressing a variation of the frequency of the utility grid based on conversion information which indicates a predetermined relation between the variation of the frequency and the instruction value when the variation of the frequency of the utility grid measured by the measurement unit exceeds a predetermined standard,
wherein the instruction value generation unit is configured to:
generate the instruction value based on a first gain at a control system generating the instruction value in an initial phase after a start of the variation of the frequency of the utility grid; and
generate the instruction value based on a second gain smaller than the first gain at the control system in a later phase after the initial phase of the variation of the frequency of the utility grid.

* * * * *